United States Patent
Krawczyk et al.

(10) Patent No.: US 9,483,629 B2
(45) Date of Patent: Nov. 1, 2016

(54) DOCUMENT AUTHENTICATION BASED ON EXPECTED WEAR

(71) Applicant: Dragnet Solutions, Inc., Novato, CA (US)

(72) Inventors: Stephen J. Krawczyk, Ann Arbor, MI (US); Gregory M. Cote, San Rafael, CA (US); Marc S. McClung, Santa Rosa, CA (US)

(*) Notice: Subject to any disclaimer, the term of this patent is extended or adjusted under 35 U.S.C. 154(b) by 26 days.

(21) Appl. No.: 14/496,266

(22) Filed: Sep. 25, 2014

(65) Prior Publication Data

US 2015/0089615 A1    Mar. 26, 2015

Related U.S. Application Data (60) Provisional application No. 61/883,133, filed on Sep. 26, 2013.

(51) Int. Cl.
| | |
|---|---|
| G06F 7/04 | (2006.01) |
| G06F 21/31 | (2013.01) |
| G06F 21/34 | (2013.01) |
| H04L 9/32 | (2006.01) |
| H04L 29/06 | (2006.01) |

(52) U.S. Cl.
CPC .......... *G06F 21/31* (2013.01); *G06F 21/34* (2013.01); *H04L 9/3234* (2013.01); *H04L 63/123* (2013.01); *H04L 63/0823* (2013.01)

(58) Field of Classification Search
CPC ............... H04L 63/0823; H04L 63/0853
USPC .......................................................... 726/7
See application file for complete search history.

(56) References Cited

U.S. PATENT DOCUMENTS

| | | |
|---|---|---|
| 5,027,113 A | 6/1991 | Bonnaval-Lamothe |
| 6,292,092 B1 | 9/2001 | Chow |
| 6,655,585 B2 | 12/2003 | Shinn |
| 6,676,017 B1 | 1/2004 | Smith, III |
| 7,096,204 B1 | 8/2006 | Chen |
| 7,172,113 B2 | 2/2007 | Olenick |
| 7,377,427 B2 | 5/2008 | Murata |
| 7,690,032 B1 | 3/2010 | Peirce |
| 7,708,189 B1 | 5/2010 | Cipriano |
| 7,779,457 B2 | 8/2010 | Taylor |
| 7,783,379 B2 | 8/2010 | Beane |
| 7,793,837 B1 | 9/2010 | Faith |
| 7,853,792 B2 | 12/2010 | Cowburn |
| 7,911,655 B2 | 3/2011 | Hatzav |
| 7,920,714 B2 | 4/2011 | O'Neill |
| 7,931,194 B2 | 4/2011 | Keys |
| 7,983,452 B2 | 7/2011 | Chaney |
| 8,078,875 B2 | 12/2011 | Cowburn |
| 8,086,867 B2 | 12/2011 | Freeman |
| 8,094,889 B2 | 1/2012 | Gonzalez |

(Continued)

*Primary Examiner* — Teshome Hailu
(74) *Attorney, Agent, or Firm* — Knobbe, Martens, Olson & Bear, LLP (57) ABSTRACT

Systems and methods are disclosed that enable authentication based on a physical document. Specifically, a document authentication service is disclosed that utilizes characteristics of a physical document, such as an identification card already in a user's possession, to authenticate a user. In one embodiment, the characteristics of a document may be processed based at least in part on an expected wear of the document (e.g., from use by the user). Expected wear may be identified, for example, based on historical data gathered across a number of users of the document authentication service.

18 Claims, 6 Drawing Sheets

(56) References Cited

U.S. PATENT DOCUMENTS

| | | |
|---|---|---|
| 8,103,046 B2 | 1/2012 | Cowburn |
| 8,434,675 B2 | 5/2013 | Faith |
| 8,504,828 B2 | 8/2013 | Quine |
| 9,087,204 B2 * | 7/2015 | Gormley .................... G07F 7/08 |
| 2003/0070074 A1 | 4/2003 | Geller |
| 2004/0258280 A1 | 12/2004 | Merry |
| 2006/0129485 A1 | 6/2006 | Hamzy |
| 2006/0157559 A1 | 7/2006 | Levy |
| 2006/0236110 A1 | 10/2006 | Schaub |
| 2007/0261114 A1 | 11/2007 | Pomerantsev |
| 2008/0224823 A1 | 9/2008 | Lawson |
| 2009/0152357 A1 | 6/2009 | Lei |
| 2009/0164796 A1 * | 6/2009 | Peirce ...................... G06F 21/32 713/186 |
| 2010/0252625 A1 | 10/2010 | Register, Jr. |
| 2010/0289614 A1 * | 11/2010 | Rechner ............. G07C 9/00103 340/5.2 |
| 2010/0316251 A1 | 12/2010 | Cowburn et al. |
| 2011/0138446 A1 | 6/2011 | Barrett |
| 2011/0188759 A1 | 8/2011 | Filimonova et al. |
| 2011/0267601 A1 * | 11/2011 | Woodford ................ G07D 7/18 356/71 |
| 2011/0276484 A1 | 11/2011 | Pearson |
| 2011/0289322 A1 | 11/2011 | Rasti |
| 2012/0140292 A1 | 6/2012 | Gerigk |
| 2012/0324534 A1 | 12/2012 | Mandridake |

* cited by examiner

DOCUMENT AUTHENTICATION BASED ON EXPECTED WEAR

CROSS-REFERENCE TO RELATED APPLICATION

This application claims the benefit of U.S. Provisional Patent Application No. 61/883,133, entitled DOCUMENT AUTHENTICATION BASED ON EXPECTED WEAR, and filed Sep. 26, 2013, the entirety of which is incorporated herein by reference.

BACKGROUND

User authentication, as may be used in a variety of security contexts, generally relies on one or more of three authentication factors: knowledge (e.g., knowledge unique to the user); inherence (e.g., a unique and inherent characteristic of the user) and possession (e.g., a unique item in the user's possession). Passwords are a typical example of a knowledge authentication factor, as they represent information that is expected only to be known to the user. Knowledge factors generally include substantial limitations. For example, the security of a password is directly dependent on its complexity, and as complexity is increased, a user is less likely to correctly recall the password.

Inherence factors, such as biometric information, can at least partially correct these features, since biometric information can be inherently complex and does not require the user to recall the information. However, the hardware required to implement inherence factors can often be prohibitively expensive, and the variety of different standards and implementations make widespread adoption problematic.

Possession-based authentication generally relies on a unique object in the possession of a user, such as a smart card, RFID chip, or cryptographic key fob. These objects may also be referred to in various forms as security tokens, authentication tokens, hardware tokens or cryptographic tokens. Often, security tokens are associated with similar drawbacks to the use of biometrics, in that the tokens or hardware required to use the tokens may be prohibitively expensive and adhere to a number of different standards and implementations. In addition, unlike biometric authentication factors, security tokens may be lost by users.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Aspects of the present disclosure generally relate to systems and computerized processes for authenticating users based at least in part on inherent characteristics of physical documents. Physical documents may include, but are not limited to, driver's licenses, passports, birth certificates, social security cards, student identification cards, and other government or privately issued identification cards or badges. Specifically, a document authentication service is disclosed that enables users or authorized parties to submit information regarding a physical document (e.g., a photograph or scan of the document) to the document authentication service for enrollment. The document authentication service may process the received information to generate a security token representative of the physical document. The security token may be generated based at least in part on physical characteristics of the document, such as the size and shape of the document, or patterns and colors within the document. In one embodiment, abnormalities within the document are utilized in the generation of the security token, as these abnormalities are unlikely to exist in other similar documents. For example, artifacts resulting from creation, printing, or manufacture of the document may be utilized to generate the security token. In order to subsequently authenticate with the document authentication service, a user may present the same physical document at an authentication end point. Information regarding the document can then be transmitted to the document authentication service for comparison with the previously generated security token. In some embodiments, comparison of a presented document with a previously generated security token may be based at least in part on an expected wear of the physical document. For example, an acceptance threshold for such a comparison may be based at least in part on the length of time since the physical document was last presented for authentication.

The use of physical documents as authentication tokens may overcome some traditional limitations of security tokens, which generally require users to possess an additional, unique physical object. Because many if not most people already carry at least one physical document (e.g., a driver's license or identification card), use of such documents as authenticating tokens would not require users to constantly possess any additional items. In addition, the use of already existent physical documents results in a lower cost of service, as no security tokens need be distributed to users and no replacement cost for lost or damaged documents is assessed on the document authentication service. For ease of reference, the term "security token" is used within various examples described herein, and generally refers to a set of information representative of a document presented for authentication by a user. In some instances, information representative of a document may additionally or alternatively be referred to as an authentication token, hardware token or cryptographic token.

The document authentication service may generally interact with a number of authentication end points to facilitate both enrollment of documents as security tokens and authentication based on those documents. Authentication end points may include any location at which a user desires or is required to be authenticated, including but not limited to a user computing device, a point of sale, a banking terminal (e.g., an automated teller machine, and an access checkpoint. Though discussed generally herein as locations, authentication end points may in some instances be mobile (e.g., where the authentication end point is a user's mobile computing device). Each authentication end point may be configured with a scanner, imager, or other device capable of capturing required information of the physical document and transmitting such information to the document authentication service. The specific configuration of an authentication end point may be based in part on the document itself and/or information required. For example, where a document contains optical elements (e.g., barcodes, watermarks, pictures, print letters, ultraviolet or infrared markings, etc.), the authentication end points may include an optical scanner or image sensor (e.g., camera) to capture those optical elements. As a further example, where a document contains magnetic- or radio frequency-accessible information, an authentication end point may include magnetic or radio frequency readers to capture such information. Accordingly, a user may interact with the authentication end point in order capture any necessary information from the physical document. This information may then be transmitted to the document authentication service for enrollment or authentication. As will be discussed in more detail below, in some instances, authentication end points may process, transform, or modify the information prior to transmission to the document authentication service (e.g., to normalize the information or facilitate more rapid transmission).

During enrollment, a user may provide information regarding a not-previously-enrolled document to the document authentication service for initial processing. On reception of the document information, the document authentication service can process the information in order to generate a security token corresponding to the document. Such a security token generally represents a unique (or substantially unique) set of information corresponding to the physical document. A security token may be generated based on any set or combination of information within the physical document, including both information presented by the document (e.g., text, photographs, or digital encodings represented by the document) and characteristics of the document not intended to convey information (e.g., size, shape, color, condition, or anomalies within all or a portion of the document). In some instances, security tokens may be generated based on processing document information according to one or more algorithms. For example, a security token may be generated based at least in part on transforming document information from a spatial domain (e.g., as represented in an image) into a frequency domain (e.g., as generated by a Fourier transform of that image). As a further example, a security token may be generated based at least in part on transforming image information of a document into textual information (e.g., by passing the image through an optical character recognition (OCR) algorithm). Further, generation of a security token may utilize one or more hashing algorithms to both ensure uniqueness of the security token and to reduce the total size or complexity of the security token. In some embodiments, specific aspects or portions of a document may be processed in order to determine a set of basis functions representative of a document, as well as one or more coefficients for each basis function. Illustratively, such coefficients, when used in connection with the basis functions, may provide a mathematical representation of the document. Basis functions for a presented document (or coefficients of such functions) may thereafter be compared to basis functions of a previously enrolled document (or coefficients related to the previously enrolled document) to determine potential validity of a document based on expected wear. In general, the basis functions across a number of documents of the same type may be expected to be similar. Accordingly, some embodiments of the present disclosure may generate a security token based on basis function coefficients corresponding to a specific document, independently of the basis functions themselves. While various examples of algorithms used to generate security tokens are described herein, any set of well-known algorithms, such as wavelet analysis or principal component analysis algorithms, may additionally or alternatively be used to generate the security token.

After generation of a security token, the document authentication service may store the security token within a data store (e.g., a database) for future authentication purposes. The document authentication service may also transmit a confirmation to the authentication end point to verify enrollment of the document.

Thereafter, a user is enabled to present the same physical document at another authentication end point, where the document authentication service again generates a security token based on the document. The generated security token may be compared to security tokens previously collected by the document authentication service to authenticate the user. Because each security token is unique (or extremely statistically likely to be unique), possession of the document reflects that the user is the same entity that previously enrolled with the document authentication service. Accordingly, the user may be granted security rights associated with the previously enrolled document. In one embodiment, the document authentication service may compare a generated security token to a single previously generated security token, such as a previous security token generated for the user requesting authentication. In another embodiment, the document authentication service may compare a generated security token to multiple previously generated security tokens (e.g., tokens of multiple documents or multiple users). Such previously generated security tokens may be selected, for example, based on similarity to the currently presented security token.

Generation of a security token by the document authentication service is not wholly (or, in some instances, even partially) dependent on information presented by the document (e.g., name, date of birth, identification number, address, gender, country of issuance, etc.). Accordingly, forgeries of such information would not be sufficient to imitate an original physical document. Moreover, a security token may be generated based at least in part on characteristics inherent to a physical document that are practically or actually unable to be forged, such as manufacturing defects or wear patterns (e.g., fading, cracking, or tearing). Accordingly, use of the document authentication service may substantially guarantee authentication is granted only to possessors of a single physical document.

While the present application may not require verification of personal information within a document, embodiments of the present application may nevertheless verify such personal information, or work in conjunction with other systems and methods for verification of personal information. Illustratively, the document authentication service disclosed herein may communicate with an identity verification service to verify an identity of a user, as will be described in more detail below.

In some embodiments, the document authentication service may be configured to authenticate users based on physical documents, even when such documents experience changes over time. For example, the document authentication service may enable authentication of worn, damaged, or modified documents, such as documents including folds, scrapes, tears, worn features (e.g., illegible text or a reduced visibility photograph), reduced magnetic signal (e.g., based on worn magnetic stripes) or altered chemical composition (e.g., due to time- or exposure-based chemical reactions within the document). As will be described in more detail below, authentication of a document can be based at least in part on an acceptable deviation of the presented document to a previously enrolled version of the document. In one instance, the level of acceptable deviation can be based at least in part on an expected wear of the document and a duration since the document was last presented for authentication. For example, where a document has been recently presented and is associated with low expected wear (e.g., a robust plastic identity card), the acceptable deviation from the previous version of the same document may be very low. Conversely, where document has not been recently presented and is associated with high expected wear (e.g., a paper identity card), the acceptable deviation from the previous version of the same document may be higher. In this manner, the document authentication system can authenticate even documents that are expected to degrade over time and with use.

In some instances, different portions of a document may be associated with varying levels of expected wear. For example, the raised numbering on a credit card may be expected to wear more quickly than text that sits flush with the face of a card. As a further example, features on the edges of a card may be expected to wear more quickly than features near the center of the card. In some instances, systems of the present disclosure may utilize varying rates of expected wear in order to authenticate a document. For example, systems disclosed herein may attempt to authenticate a document based on areas that are expected to wear relatively less quickly than other areas (e.g., because the accuracy in predicting expected wear of a given portion may have a direct or proportional relationship to the extent of the expected wear for the given portion). As a further example, the system may authenticate a document based at least in part on a determination that multiple portions are wearing at an expected relative rate (e.g., that raised numbering is wearing proportionally more quickly than other text, that edge features are wearing proportionally more quickly than center features, etc.). Illustratively, if wear levels for various sections of a document have not incurred wear at their expected relative rates (e.g., if all portions show a similar amount of wear, despite varying expected wear rates), the system may determine that the document has been artificially worn (e.g., as part of a forgery attempt). Expected wear of a document may be based at least in part on historical data regarding the document or similar documents. For example, expected wear of a document can be based on observed wear that has occurred within documents of the same type submitted to the document authentication service. Documents types may include, by way of non-limiting example, a specific composition of a document (e.g., metal, plastic, laminated paper, unlamented paper, magnetized stipe, etc.), a specific purpose of a document (e.g., driver's license, passport, worker ID badge, etc.), a specific jurisdiction of a document (e.g., U.S. military identification card, state identification card, etc.), or any combination thereof.

Embodiments of the present disclosure may utilize document-based security tokens independently or in combination with other authentication techniques. For example, embodiments of the present application may be utilized in order to allow user authentication based solely on possession of a specific document (e.g., a driver's license). Further, embodiments of the present application may be utilized to allow document-based authentication in conjunction with other authentication techniques, such as knowledge-based authentication (e.g., "something you know"), biometric authentication (e.g., "something you are"), or other security-token based authentications (e.g., "something you have"). While specific examples may be presented that relate to the use of document-based authentication, these examples are not intended to exclude the use of alternate authentication techniques.

Figure 1:
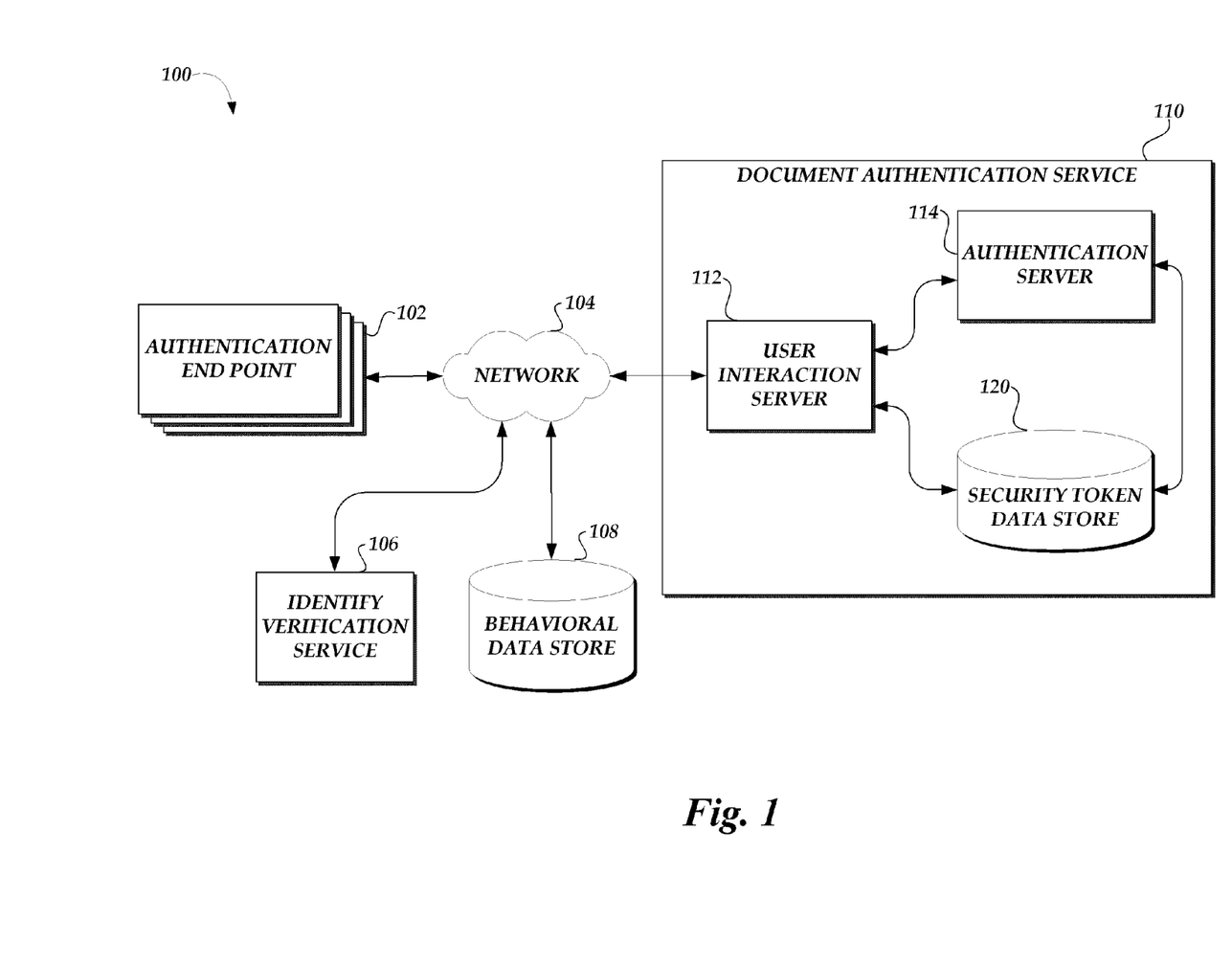
FIG. 1 is a block diagram depicting an illustrative operating environment enabling the use of physical documents as security tokens, including a document authentication service configured to authenticate documents based at least in part on inherent characteristics of the document and an expected level of wear of the document.

Turning to FIG. 1, a schematic block diagram is shown depicting an illustrative operating environment 100 in which one or more authentication end points 102 may interact with a document authentication system 110 to authenticate a user based on an enrolled document. As will be described below, document authentication system 110 may further enable an authentication of users even where an enrolled document has been modified since enrollment (e.g., based on continued use or wear of the document). As illustrated in FIG. 1, the operating environment 100 includes one or more user authentication end points 102 in communication with the document authentication system 110 via a network 104.

Authentication end points 102 may include any computing device configured to enable a user to present a physical document for authentication by the document authentication server 110. Examples of authentication end points 102 include, but are not limited to, desktops, laptops, tablets, mobile telephones, personal digital assistants, wearable computing devices, point of sale devices, automated teller machines, kiosks, and special-purpose authentication computing devices (e.g., as may be placed at a security checkpoint in connection with a secured location). In some instances, authentication end points 102 may be under control or ownership of the user being authenticated. In other instances, authentication end points 102 may be under the control of a third party (e.g., seeking to authenticate the user). Authentication end points 102 may include any combination of software and hardware enabling a user to present a physical document for authentication, including a network interfaces, memories, processing units, computer readable medium drives, and physical document information collection devices (e.g., optical scanners, cameras, barcode readers, magnetic stripe readers, and radio frequency readers including those used in reading radio frequency identification (RFID) signals and/or near field communication signals (NFC)). Users, utilizing an authentication end point 102, may capture information regarding a physical document, and communicate such information to the document authentication system 110 in connection with either or both of enrollment or authentication.

The network 104 may be any wired network, wireless network or combination thereof. In addition, the network 104 may be a personal area network, local area network, wide area network, cable network, satellite network, cellular telephone network, ad hoc or peer-to-peer network, radio access network (RAN), or combination thereof. Further, network 104 may be a publically accessible network (e.g., an interoperable public safety broadband network, such as FirstNet) or privately operated network (e.g., as established by a business, government or military organization). In the illustrated embodiment, the network 104 is the Internet. Protocols and components for communicating via the Internet or any of the other aforementioned types of communication networks are well known to those skilled in the art of computer communications and thus, need not be described in more detail herein.

The document authentication system 110 is illustrated in FIG. 1 as operating in a distributed computing environment including several computer systems that are interconnected using one or more networks. More specifically, the document authentication system 110 may include a user interaction server 112, an authentication server 114, and a security token data store 120 discussed in greater detail below. However, the document authentication system 110 may have fewer or greater components than are illustrated in FIG. 1. In addition, the document authentication system 110 could include various web services and/or peer-to-peer network configurations. Thus, the depiction of document authentication system 110 in FIG. 1 should be taken as illustrative and not limiting to the present disclosure.

Additionally, in some embodiments, some or all components of the document authentication system 110 may be executed by one or more virtual machines implemented in a hosted computing environment. A hosted computing environment may include one or more rapidly provisioned and released computing resources, which computing resources may include computing, networking and/or storage devices. A hosted computing environment may also be referred to as a cloud computing environment.

Any one or more of the user interaction server 112, the authentication server 114, and the security token data store 120 may be embodied in a plurality of components, each executing an instance of the respective user interaction server 112, authentication server 114, and security token data store 120. A server or other computing component implementing any one of user interaction server 112, the authentication server 114, and the security token data store 120 may include a network interface, memory, processing unit, and computer readable medium drive, all of which may communicate which each other may way of a communication bus. The network interface may provide connectivity over the network 104 and/or other networks or computer systems. The processing unit may communicate to and from memory containing program instructions that the processing unit executes in order to operate the respective user interaction server 112, authentication server 114, and security token data store 120. The memory may generally include RAM, ROM, other persistent and auxiliary memory, and/or any non-transitory computer-readable media.

With further reference to FIG. 1, illustrative components of the document authentication system 110 will now be discussed. Specifically, the document authentication system 110 includes a user interaction server 112 configured to enable users to interact with the document authentication server 110 to enroll and/or authenticate physical documents. In one embodiment, the user interaction server 112 includes a web server hosting web content (e.g. web pages) that is accessible by authentication end points 102. Illustrative examples of web pages that may be generated based at least in part on the user interaction server 112 are described below with reference to FIGS. 4A and 4B. In another embodiment, the user interaction server 112 may enable interaction with dedicated applications operating on an authentication end point 102 (such as a desktop application, mobile application, or dedicated operating system). Interaction with dedicated applications may occur, for example, by use of an application programming interface (API). Such an API may facilitate reception of enrollment or authentication requests from authentication end points 102, reception of physical document information from authentication end points 102, and transmission of authentication result information to authentication end points 102.

The user interaction server 112 is in communication with an authentication server 114. The authentication server 114 enables enrollment of documents into the authentication system 110, as well as authentication based on such documents. Specifically, the authentication server 114 is configured to generate a security token based on received document information and that uniquely identifies the document. The authentication server 114 generates a security token based on any set or combination of information within the physical document, such as information presented by the document and/or inherent characteristics or the document. In some instances, the authentication server 114 generates a security token based on processing document information according to one or more algorithms, such as an OCR algorithm or Fourier transform. Subsequent to generation of a security token, the authentication server 114 stores the security token within the security token data store 120 for potential future use.

The authentication server 114 is further configured to authenticate users based on a physical document previously enrolled within the document authentication system 110. Specifically, the authentication server 114 can receive an authentication request from an authentication end point 102 including document information. Thereafter, the authentication server 114 can generate a security token of the document, as described above. The authentication server 114 may then determine whether a corresponding security token exists within the security token data store 120. If such a corresponding security token exists, the authentication server 114 may indicate successful authentication to the authentication end point 102 (e.g., via the user interaction server 112). In this manner, the authentication end point 102 may be notified that the physical document presented for authentication is the same document that was previously enrolled into the document authentication system 110. In some instances, the authentication server 114 may further transmit information regarding the security token or the corresponding physical document, such as a picture of the initially enrolled document, a document identification number, a user associated with the document, or a photograph of such a user. Illustratively, such information may be used at an authentication point 102 to verify information of the user. In some instances, such use may be automated. For example, an authentication end point 102 may be configured to only allow entry to a secure area after presentation of a specific physical document associated with an authorized user. In other embodiment, information regarding a document may be used by human operators at the authentication end point 102.

As will be discussed below, in some instances the authentication server 114 may not require an exact match between a newly generated security token and a corresponding security token within the security token data store 120. Specifically, in one embodiment the authentication server 114 may be configured to determine an acceptable level of difference between a new and previously generated security token (representing the current and previously presented physical documents, respectively). Such an acceptable level of difference can be determined based at least in part on the amount of time between presentations of the physical document. For example, an acceptable level of difference may be very low for a document that was recently presented for authentication (e.g., within the past 24 hours), and relatively higher for a document that has not been presented for authentication in the recent past. Such a variance in an acceptable level of difference can account for expected changes to the physical document, such as wear and degradation due to use. Such wear and degradation may be apparent, for example, in either or both of the information contained within a document (e.g., photographs, text, etc.) or the physical characteristics of the document itself. Illustratively, paper documents may become folded, scratched, torn, or faded over time. Accordingly, a paper document presented frequently (e.g., every day) is likely to show little difference at each presentation. Conversely, a paper document that is presented infrequently (e.g., once every six months) is likely to show a greater difference at each presentation. In some embodiments, an acceptable level of difference may further be based at least in part on an expected rate of wear of the document. Illustratively, plastic documents (e.g., drivers' licenses) may have a low expected rate of wear compared to paper documents (e.g., social security cards). In some embodiments, an expected rate of wear of a document may be determined based on historical wear rates of other similar documents. For example, the document authentication system 110 may determine an expected rate of wear for a driver's license based on an average rate of wear across all drivers' licenses registered with the document authentication system 110. Still further, expected changes within specific features of a document may be based on statistical modeling related to each feature. For example, a magnetic stripe feature may be expected to degrade at a specific rate (e.g., as determined based on other similar magnetic stripes, the composition of the stripes, etc.). As a further example, a feature comprised of known chemical elements may degrade at a rate dependent on such elements (e.g., due to a determined rate of chemical reaction within the feature). The expected degradation of such features may also be determined based on statistical modeling of historical document information.

While an acceptable level of difference is discussed herein with respect to an entire document, some embodiments may apply different acceptability levels to different portions of a document. For example, historical records of a specific class of document may reflect that specific portions of those documents (e.g., color photographs) tend to wear quickly, while other portions (e.g., text) tend to wear little. Accordingly, the authentication server 114 can be configured to determine whether each portion of a presented document is within an acceptable level of difference from a corresponding portion of a previously enrolled document.

In addition, the operating environment 100 may include an identification verification service 106 configured to verify the identity of a user at an authentication end point 102. As noted above, the document authentication system 110 is generally configured to determine whether a physical document presented for authentication corresponds to a previously enrolled physical document. Such a determination may not generally depend upon verification of the identity of the individual presenting the document. For example, while document information may be used to generate a security token of a document, the document authentication system 110 might not generally attempt to verify that such information is correct. Accordingly, in some embodiments, the document authentication system 110 may work with an identity verification service 106 configured to verify the identity of a user based at least in part on a physical document. Interaction between the document authentication system 110 and the identity verification service 106 may be facilitated, for example, by an API of the identity verification service 106. Thereafter, information gained from the identity verification service 106 by the document authentication system 110 may be provided to the authentication end point 102. The specific functionality of the identity verification service 106 is outside the scope of the present disclosure, and multiple examples of such verification services are well known within the art. Accordingly, the specific functionality of the identity verification 106 will not be discussed in further detail herein.

In some instances, the operating environment 100 may further include a behavioral data store 108, which holds information regarding the actions and behaviors of users and/or physical documents. Behavioral information can include, for example, dates and times associated with actions of users and/or physical documents (e.g., timing of authentication of users), locations of those actions, and additional information regarding those actions. For example, where a behavioral data store 108 includes financial data of a user, behavioral data may include financial transaction dates and times of the user, transactional types, transactional amounts, etc. As a further example, where a behavioral data store 108 includes job or housing information of a user, behavioral data may include housing addresses and dates, rent amounts, mortgage information, employer identities, employment periods, compensation amounts, etc. Information within the behavioral data store 108 may be utilized by the document authentication system 110 in conjunction with document enrollment and/or authentication. For example, in one embodiment the authentication server 114 is configured to verify a document presented for authentication based at least in part on a last known location of that document. For example, where a document was presented for authentication in New York at a first point in time, and only hours later is presented for authentication in Los Angeles, the authentication server 114 may determine that at least one of the presented documents is not genuine. In other embodiments, the authentication server 114 may utilize information within the behavioral data store 108 to determine anomalous activity of a document or a user. For example, where a document is typically presented for authentication according to a set pattern, the authentication server 114 may refuse to authenticate the document when presented outside the pattern, or may warn the authentication end point 102 that the document is being presented outside of a normal pattern. Accordingly, utilization of the information within a behavioral data store 108 may increase the accuracy of the authentication server 114 in authenticating documents.

Though shown as a single data store, behavioral data store 108 may include a combination of independent or distinct data stores. Such data stores may be operated by one or more distinct entities either associated or unassociated with the document authentication system 110.

Other configurations than shown within FIG. 1 are possible and within the scope of the present disclosure. For example, in some instances the identity verification service 106 and the behavioral data store 108 may be integrated or associated with a single service. As a further example, the identity verification service 106 and/or the behavioral data store 108 may be integral to or included within the document authentication system 110. As yet another example, in some instances all or a portion of the components of the document authentication service 110 may be integrated with an authentication end point 102. Illustratively, where the authentication end point 102 includes a persistent memory, a security token data store 120 may be included in the authentication end point 102. Accordingly, the configuration of elements within FIG. 1 is intended to be illustrative in nature.

Figure 2:
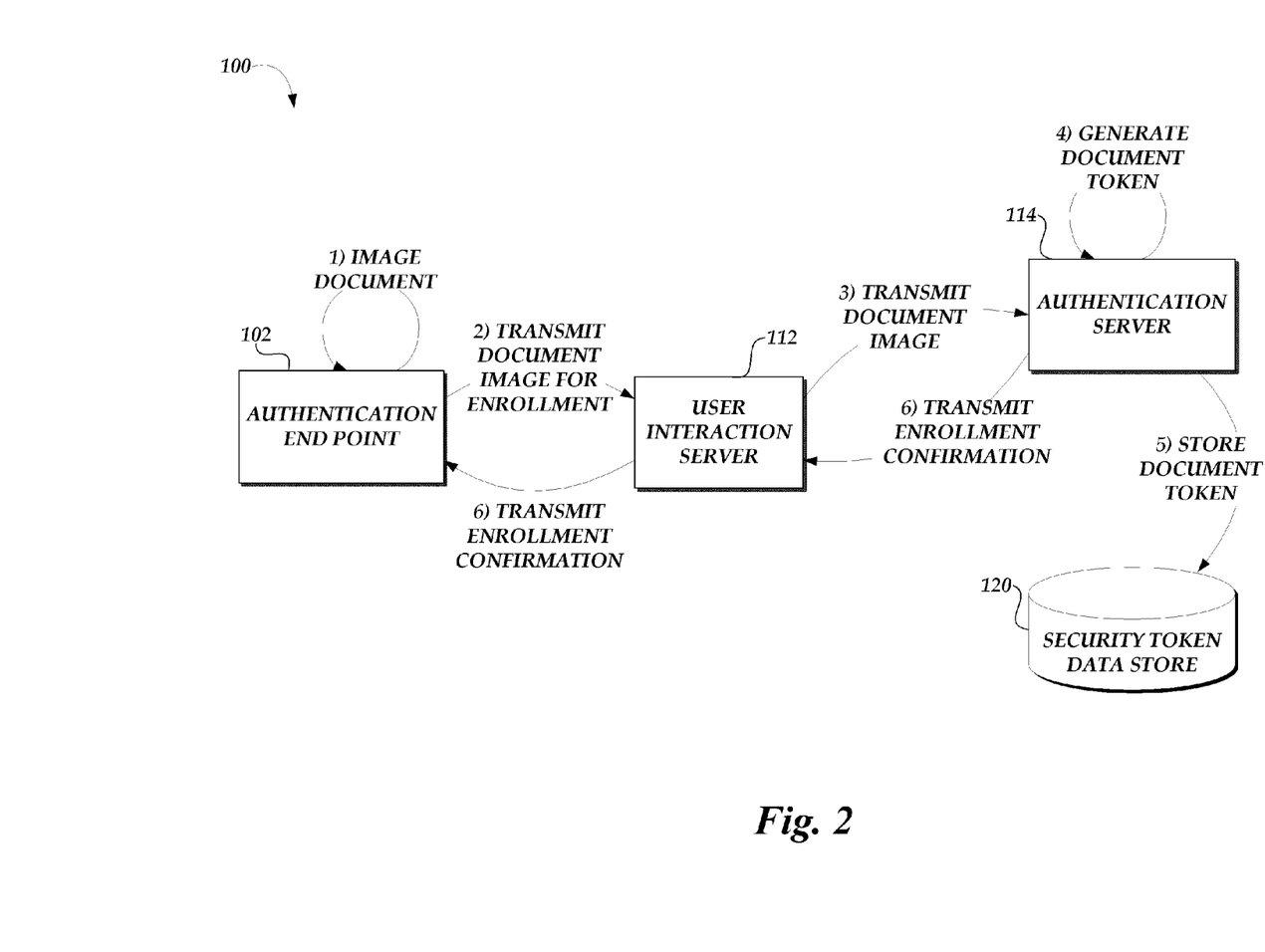
FIG. 2 is an illustrative block diagram of the operating environment of FIG. 1 depicting the enrollment of a physical document into the document authentication service.

With reference to FIG. 2, an illustrative interaction between an authentication end point 102 and elements of the document authentication system 110 will be described. Specifically, the interactions of FIG. 2 may represent enrollment of a document into the document authentication system 110 by a user. The interactions being at (1), where a user's physical document is presented at an authentication end point 102. As noted above, the authentication end point 102 may include any of a variety of inputs to receive information regarding the physical document. In the illustrative interaction of FIG. 2, the authentication end point includes a camera capable of taking a photograph of the presented physical document. Accordingly, a user or authorized third party can take a photograph of the document, which may then be transmitted to the user interaction server 112 along with a request to enroll the document within the document authentication system 110. In some instances, a document photograph may be transmitted to the user interaction server 112 without further modification (e.g., as a JPG image). In other instances, the authentication end point 102 may be configured to modify the document image prior to transmission to the user interaction server 112, such as by compressing the image, cropping the image, aligning the image, and/or modifying the contrast or brightness of the image. After such processing, the image is transmitted to the user interaction server 112 at (2). In some instances, information regarding the presented document is sent independently. In other embodiments, the authentication endpoint 102 may transmit additional information regarding the document or a user presenting the document. Illustratively, the authentication endpoint 102 may transmit an indication of an asserted identifier of the document or of the user. Examples of such identifiers include, but are not limited to, a user name or identifier, a document enrollment identifier, an account identifier, or an organizational identifier. The document authentication service 110 may thereafter utilize the asserted identifier to locate a corresponding document enrolled within the document authentication service 110.

After reception of the image, enrollment request and identifier information, the user interaction server 112, at (3), forwards the received image and identifier information to the authentication server 114. Thereafter, at (4), the authentication server 114 generates a security token based at least on the received document image. In one embodiment, the authentication server 114 processes the received image to determine both physical attributes of the original document and information contained within or conveyed by the original document. Illustratively, the authentication server 114 may utilize an edge detection routine, such as the Canny edge detection algorithm, to determine the overall size and shape of the document. The authentication server 114 may further process the image to determine other characteristics of the document, such as the color, tone, and texture. In one instance, the authentication server 114 may process the entire received image at once, to determine overall characteristics of the document. In another instance, the authentication server 114 may process one or more portions of the image independently, to determine characteristics of each portion of the image. In some embodiments, the security token may also be generated based at least in part on identifier information submitted by the user.

In addition, the authentication server 114 may process the image to attempt extraction of information conveyed by the image, such as textual information. In one instance, processing the image to extract information may include passing all or part of the image through an OCR algorithm. In another instance, processing the image to extract information may include isolating specific portions of the document, such as a photograph printed on the document. In some such instances, the authentication server 114 may utilize a facial recognition routine to determine whether a photograph within the received image corresponds to a known photograph or identity. In some embodiments, information extracted from the document image can be utilized, independently or in addition to submitted information, to determine an identifier for the document. For example, where an OCR algorithm extracts a user's name from the document, such a name may be utilized as a user identifier. Similarly, an extracted document identification number may be utilized as a document identifier. In this manner, the document authentication service 110 may assign an identifier to a processed document, even where no identifier is provided by the authentication end point 102.

The authentication server 114 may then utilize both characteristics of the document and information conveyed by the document to generate a security token corresponding to the document. In one instance, a security token may include all data extracted from the document. In another instance, a security token may include only a portion of the data extracted. The authentication server 114 may select such portions based on the uniqueness of the information contained within the portions, which may be determined based on a predetermined set of document templates (e.g., information as to how an average document would appear) and/or historical data of similar documents. For example, where the originally scanned document is a driver's license, the document image may include the text "State Driver's License" in a corner of the document. The authentication server 114 may compare this text to other scanned driver's licenses, or a predefined driver's license template, to determine that such text is common among driver's licenses. Accordingly, the authentication server 114 may not base a security token off this text. Conversely, in an instance where the originally scanned document is a driver's license and the same portion of the document image includes the text "Driver's Li se" (e.g., due to damage or modification to the license, due to image recognition issues by the authentication server 114, or both), the authentication server 114 may be highly likely to utilize this portion in creating a security token. Additional examples of unique or unusual information within a document image include abnormalities in creation, printing, or manufacture of the document (e.g., artifacts within photographs of the document), as well as evidence of unusual wear, chipping, cracking, bend marks, bubbling of laminate, and staining. Because this information is unlikely to exist within another document, the information is a good candidate for generation of a unique security token.

In one embodiment, machine learning techniques may be utilized in order to identify unique or non-unique portions of a document. Illustratively, a training data set may be created including a collection of documents of a given type. The authentication server 114 (or an additional component of the document authentication service 110) may thereafter utilize the training set to identify similarities and discrepancies between the documents. For example, the authentication server 114 may determine, for individual portions of the document collection, the range of variation in the portion. In instances where the training data includes new or relatively new documents, variation within a portion may be indicative of unique data (e.g., a user's name, ID number, etc.). In instances where the training data set includes documents in various states of wear, variations may be indicative of wear to the portion. In some embodiments, the training data set may indicate, for a given document within the collection, the age of the document (or other indication of the state of wear of the document). The authentication server 114 can therefore utilize the indicated age to determine whether variations are more likely the result of uniqueness or of document wear. In some instances, a machine learning data set may include data regarding a variety of document types. The authentication server 114 can utilize clustering techniques, as are well known within the art, to automatically sort documents into various document types. Moreover, where machine-learning techniques are applied to individual portions of a document (e.g., a barcode), a training data set may include similar portions (e.g., similar barcodes) extracted from a variety of document types. Thus, wear patterns from a particular feature type (e.g., barcodes, signatures, magnetic stripes, etc.) may be modeled based on data from a variety of different document types include such a particular feature type. In some instances, the authentication server 114 can utilize machine learning techniques to identify an expected wear pattern across various portions of a document. As described above, expected wear patterns (e.g., indicating relative rates of wear across portions of a given document) may be compared to a recognized wear pattern within a document in order to authenticate the document. For example, where a scanned document's wear pattern varies greatly from an expected wear pattern, the document may be determined to be fraudulent or non-authenticated. In some instances, the authentication server 114 may utilize one or more hashing algorithms to encode information regarding the document image into a security token. Such hashing algorithms may reduce the total size necessary to represent the security token, as well as remove or obfuscate sensitive information within the physical document. After creation of a security token, the authentication server 114 stores the security token within the security token data store 120. Though not shown in FIG. 2, the authentication server 114 may store additional information within the security token data store 120, such as a date and time of creation of the token, the specific authentication end point 102 from which the enrollment request was received, the user associated with the security token, etc.

In addition, after creation of a security token, the authentication server 114 may return an enrollment verification notification to the authentication end point 102 confirming that the document was successfully enrolled in the document authentication system 110.

Figure 3:
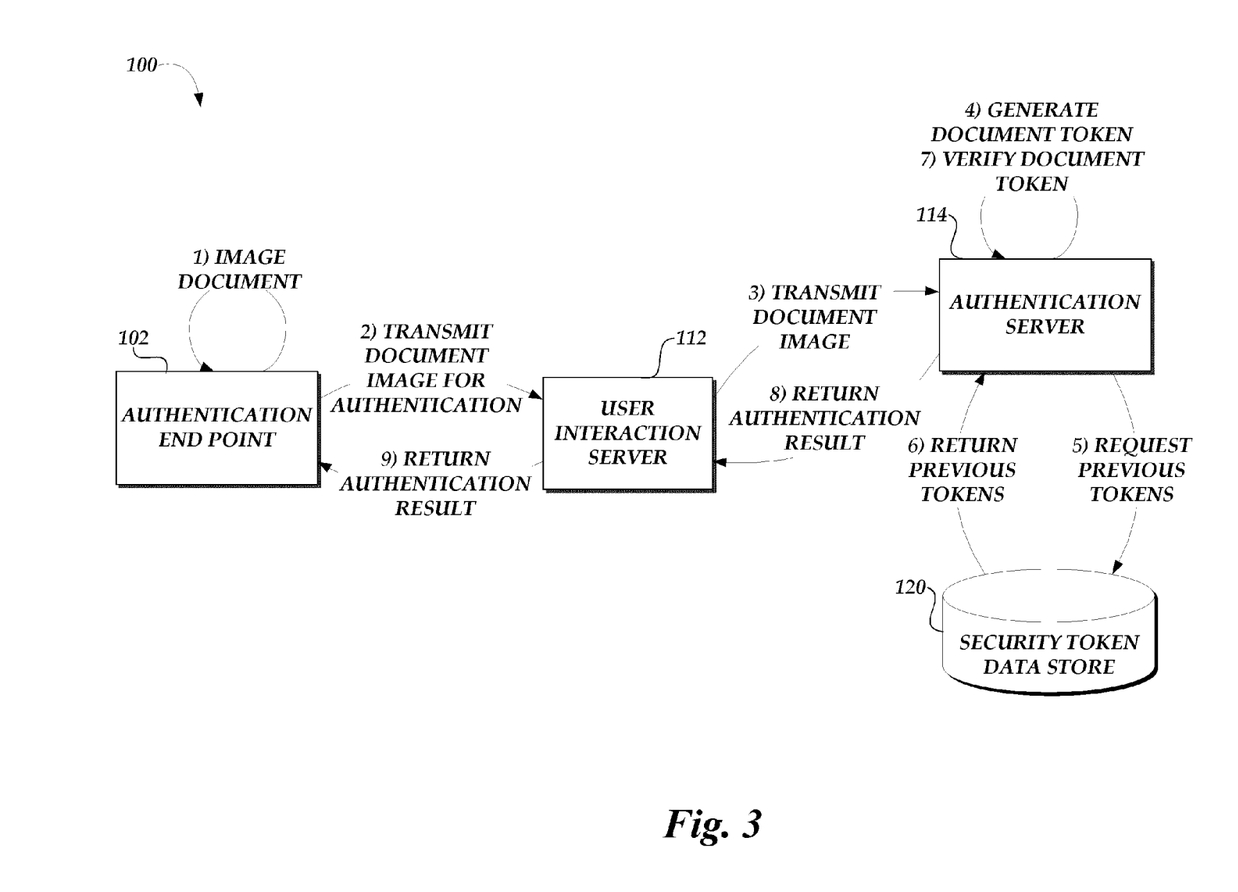
FIG. 3 is an illustrative block diagram of the operating environment of FIG. 1 depicting the use of an enrolled document to authenticate a user of the document authentication service.

With reference now to FIG. 3, an illustrative interaction for authenticating a user based on a previously enrolled physical document will be described. The authentication point 102 of FIG. 3 may be the same authentication point 102 discussed above with respect to FIG. 2 or a different authentication point 102.

With reference to FIG. 3, the illustrative interaction may begin at (1), where an image of a physical document is captured at an authentication point 102. Imaging or otherwise capturing information regarding a physical document is described in more detail above with respect to FIG. 2. Thereafter, a document image corresponding to the document is transmitted to the user interaction server 112 at (2) as a request for authentication. The user interaction server 112, in turn, forwards the received document image to the authentication server 114 at (3). As described above, the authentication endpoint 102 may, in some instances, also transmit an asserted identifier of the user or the physical document, such as a user name, user ID, or document ID. Thereafter, the authentication server 114 is configured to authenticate the document based on information regarding previously enrolled documents stored within the security token data store 120, independently or in conjunction with a provided identifier. Accordingly, at (4), the authentication server 114 generates a security token for the received document image. This security token is generated in the same manner as is described above with respect to FIG. 2, to ensure similarity been security tokens generated from the same document.

In order to determine whether the presently generated security token corresponds to any previously enrolled document, the authentication server 114 at (5) requests a set of security tokens from the security token data store 120. In one embodiment, the authentication server 114 requests all previously enrolled security tokens. In another embodiment, the authentication server 114 requests only a subset of security tokens within the security token data store 120. Such a subset may be selected, for example, based on the identifier information of the user provided at the authentication end point 102 or extracted from the presented document (e.g., corresponding to a purported user identity or a purported identifier of the presented document), based on the generated security token for the presented document (e.g., by requesting only similar tokens from the data store 120), or both. In some instances, a requested subset of security tokens may include only a single security token. For example, the authentication server 114 may request only the most recent security token generated for a purported user attempting to be authenticated. The requested tokens are returned to the authentication server 114 at (6).

Thereafter, the authentication server 114 can verify whether the security token generated for the presently presented document corresponds to any previously generated security token (e.g., of a previously enrolled document). In one embodiment, verification can include determining whether the newly generated security token directly matches any previous security token within the security token data store 120. Such a direct match may occur, for example, when the document has not changed appreciable between authentications.

In other embodiments, verification of a correspondence between the newly generated security token and a previously generated token may include determination of an acceptable variation between the tokens. As described above, acceptable variation between tokens can be based at least in part on an expected wear of the document (or portions thereof) and a duration since the document was last presented for authentication. Illustratively, a given document may be assigned an expected wear rate, represented as a percentage of variation per unit of time. Such an expected wear rate can be manually specified or automatically calculated by the authentication server 114 based on wear of other documents within the document authentication system 110. Once an expected wear rate is established for a document, the acceptable variation may be determined based on the expected wear rate multiplied by the difference in times associated with two security tokens (e.g., a duration between the current presentation of the document and a past presentation of the document).

After verifying whether the security token generated for the presently presented document corresponds to any previously generated security token, the authentication server 114 transmits a verification result (e.g., a verification pass or verification fail) to the user interaction server 112 at (8). This result is then passed to the authentication end point 102 at (9) for output to the user or an authorized third party.

Examples of user interfaces displaying verification results are described below with respect to FIGS. 4A and 4B.

As will be appreciated by one skilled in the art, FIG. 3 may include alternative or additional interactions. For example, though not shown in FIG. 3, in some embodiments the authentication server 114 can be configured to store any generated security tokens, regardless of whether authentication is or is not successful. Illustratively, storage of all security tokens may allow the authentication server 114 to track presentation of documents that fail to be authenticated (e.g., for security purposes). In addition, the authentication server 114 can, in some embodiments, be configured to update a valid security token within the security token data store 120 on successful authentication of a document. Update of security tokens may provide historical data regarding a token, so that the document authentication system 110 can track changes or wear to a document at each presentation.

In one embodiment, the security token data store 120 may include security tokens corresponding to one or more invalid documents, such as forged documents. Illustratively, security tokens of invalid documents may be generated based at least in part on a known defect in such documents (e.g., a typographical or graphical error, lack of a security feature, etc.). In other instances, security tokens of invalid documents may be generated based on a known relationship between a user and a given document. For example, security tokens may be generated for invalid documents recovered in the course of a criminal investigation. As a further example, security tokens may be generated for documents presented by suspicious persons (e.g., known criminals, users with a history of presenting invalid documents, etc.). In such embodiments, illustrative interactions of FIG. 3 may further include verification that the received image does not correspond to any invalid documents. For example, at (5), the authentication server 114 may request security tokens of invalid documents, which may be returned from the security token data store 120 at (6). Thereafter, at (7), the authentication server 114 may verify that the generated security token of the currently presented document does not match or correspond to a security token of an invalid document. Accordingly, verification of a security token by the authentication server 114 may include both verification that the presented document corresponds to a previously enrolled document as well as verification that the presented document does not correspond to a known invalid document. FIG. 4A illustrates an example of the format and content of a representative display page 400 (e.g., web page) that is generated by the document authentication system 110 to enable users to submit information within physical documents for authentication. The representative display page 400 is presented as it may appear, for example, in a web browser. Illustratively, the display page 400 is generated by the user interaction server 112 of FIG. 1. As shown in FIG. 4A, the display page 400 enables an illustrative user of the document authentication system 110, "Eugene User" 404, to request authentication based on information regarding a physical document, such as an identification card. The display page 400 further includes a set of navigation links 406 enabling Eugene User to navigate to other display pages of the document authentication system 110, such as pages for enrolling documents, de-enrolling documents and viewing previously enrolled documents.

Figure 4A:
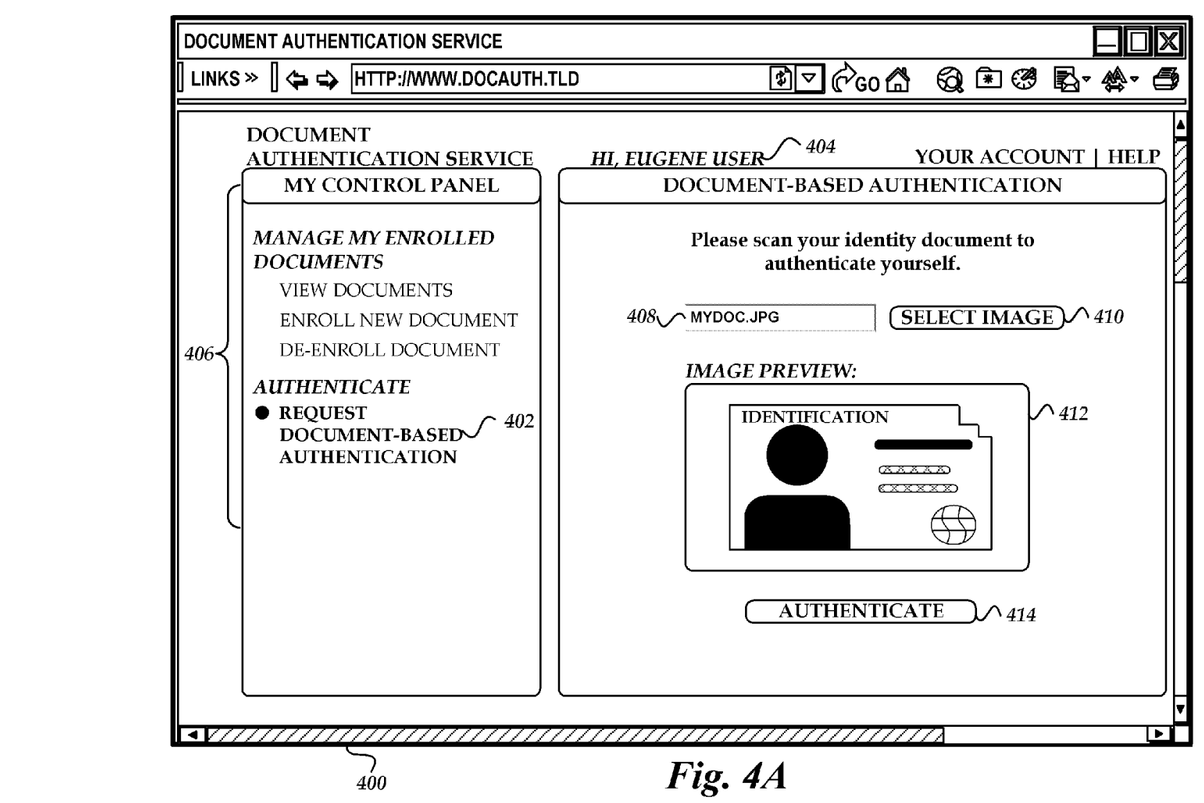
FIG. 4A depicts an illustrative user interface displayed on an authentication end point of FIG. 1 that enables user to provide an image of a document for authentication purposes.

As shown in FIG. 4A, the display page 400 enables Eugene User to submit a photograph of a physical document for authentication on the document authentication system 110. Specifically, Eugune User may utilize input 410 to select an image (e.g., as stored within or captured by an authentication end point 102) for transmission to the document authentication system 110. While images are illustratively discussed within the context of FIG. 4A, the user interface 400 may be modified to support input of non-optical information, such as magnetic or radio-frequency accessible information, as well as optical information that may not be visible to a user, such as infrared or ultraviolet information.

In the current example, Eugene User has selected the file "MYDOC.JPG," an illustrative JPG image file created, for example, by scanning a physical document at an authentication end point 102. Eugene User's selection is reflected in text box 408. In addition, the display page 400 is configured to, on selection of a document image, display a preview 412 of the document image for review by the user (e.g., to confirm adequate alignment, capture of relevant information, etc.). After verification of the image preview 412, Eugene User may select input control 414 to request authentication of the document at the document authentication system 110.

While only a single image is depicted within FIG. 4A, in some embodiments multiple images, scans, or data captures of a document may be provided via the interface 400. For example, a user may present an image of multiple sides of a document. As a further example, a user may present multiple images of a single document, each representing different visual information (e.g., visible spectrum, ultraviolet, or infrared information). As yet a further example, a user may present an image in conjunction with additional information, such as a data capture of magnetic or radio-frequency information encoded within a document.

Figure 4B:
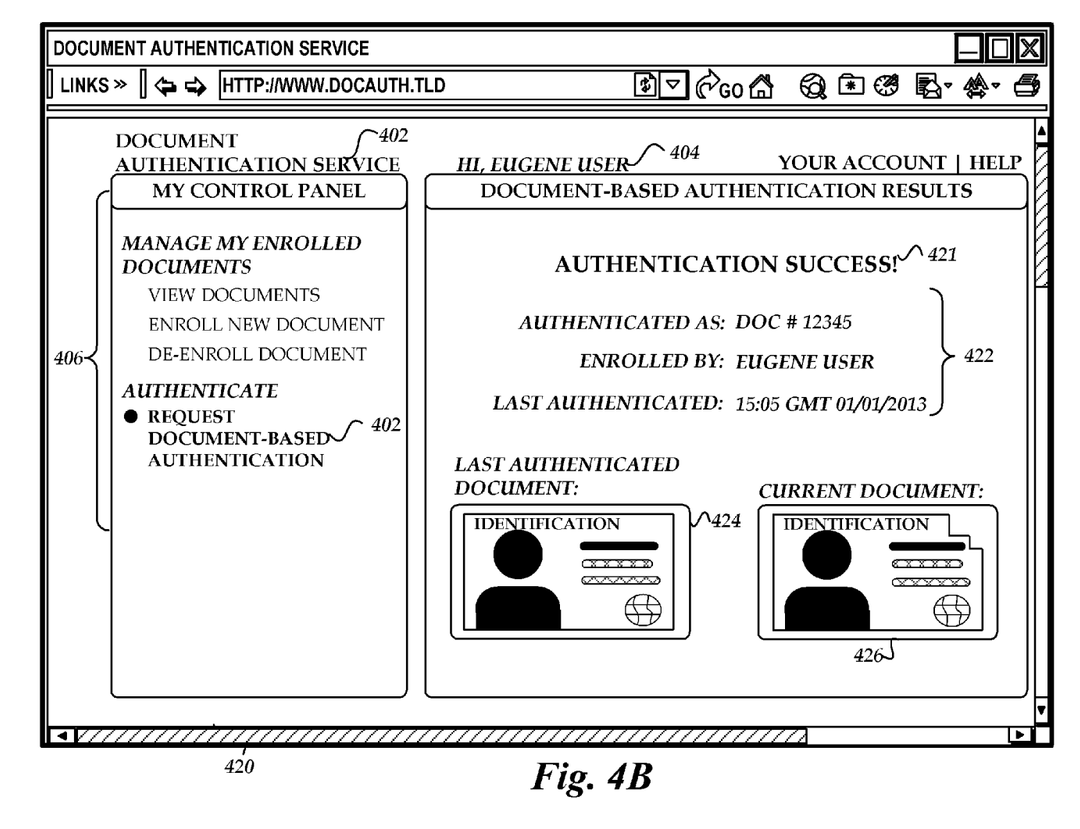
FIG. 4B depicts an illustrative user interface displayed on an authentication end point of FIG. 1 that depicts the results of a successful document-based authentication.

FIG. 4B illustrates one example of a display page 420 including the result of the authentication discussed above with respect to FIG. 4A. The display page 420 may be generated, for example, after a determination by the authentication server 114 of FIG. 1 that the currently submitted document corresponds to a previously enrolled document. The display page 420 includes an indication 421 of successful authentication, as well as information 422 regarding the successfully authenticated document (e.g., document number, enrolled user, last authentication point). In addition, the user interface 420 includes a representation of both the currently authenticated document 426 as well as the document as seen during the immediately prior authentication 424. As can be seen in FIG. 4, the currently presented document 426 is associated with a higher level of wear than the previously authenticated document 424, as the currently presented document 426 is missing a top right corner. Nevertheless, in this instance the authentication server 114 has determined that the currently presented document 426 is the same document previously presented. As described above, such a determination may be made based on a determination as to the typical level of wear associated with documents such as the currently presented document 426, as well as the time since the document was last presented.

While an image of a previously enrolled document is included in the user interface 420, additional or alternative information regarding a successful enrollment may also or alternative be included. For example, in one embodiment, a photograph of a successfully authenticated user (e.g., as captured from an enrolled document or via alternative capture) may be presented within the user interface 420.

Figure 5:
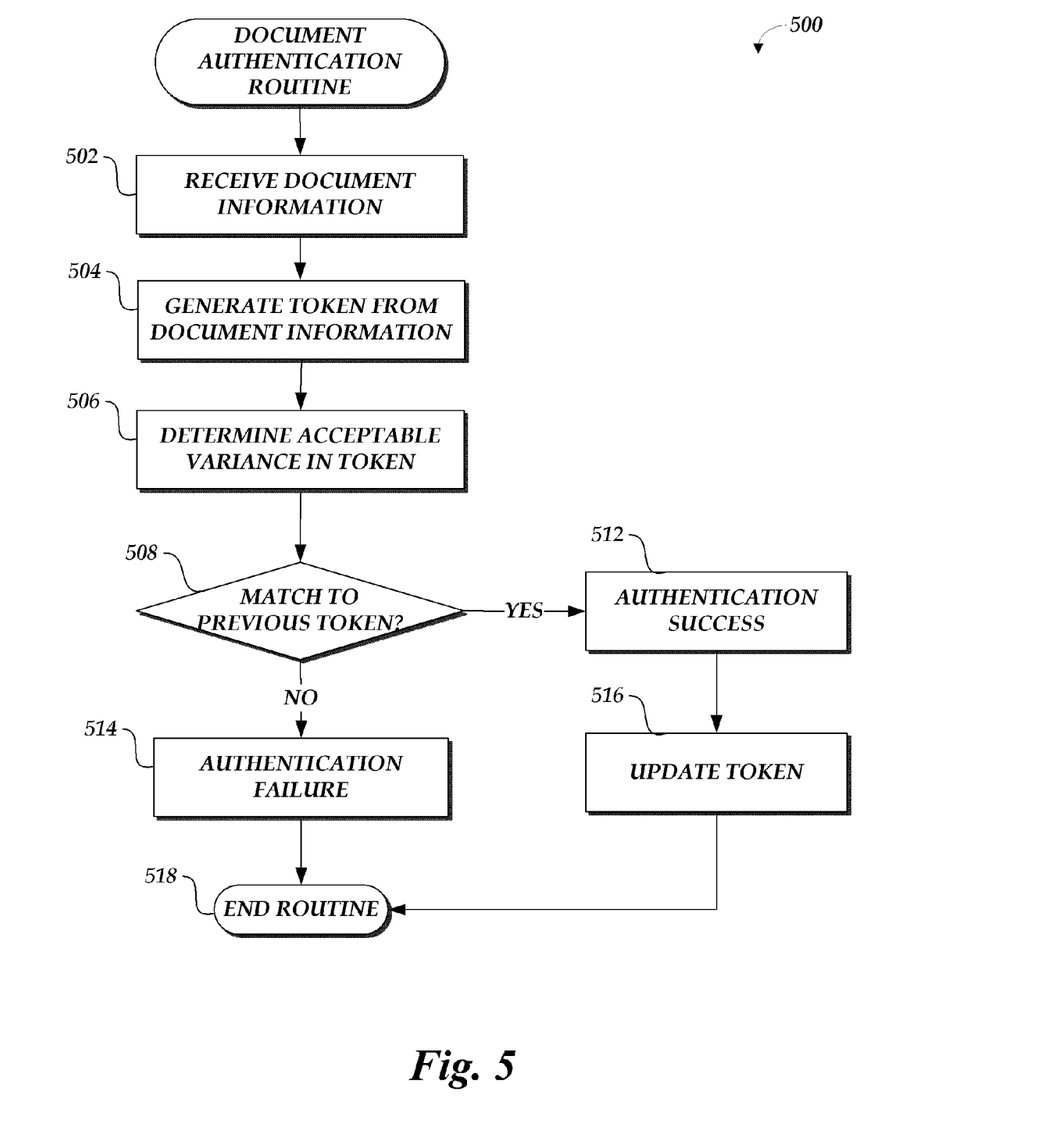
FIG. 5 is a flow diagram depicting an illustrative routine for authentication of a physical document based at least in part on inherent characteristics of the document and an expected level of wear of the document.

FIG. 5 describes an illustrative routine 500 for authenticating a user based on a physical document. FIG. 5 may be carried out, for example, by the authentication server 114 of FIG. 1. The illustrative routine 500 begins at block 502, where document information corresponding to a physical is received at the authentication server 114. Illustratively, the document information can be transmitted by an authentication end point 102 of FIG. 1 after presentation of a physical document at the end point 102 by a user.

At block 504, the authentication server 114 generates a security token corresponding to the received document information. As discussed above, the authentication server 114 can generate a security token based on any portion of the received document information. Generally, it is expected that the generation of a security token for authentication purposes will be similar or identical to the generation of a security token for enrollment purposes. Due to such similarity, correspondence between tokens generated at different points in time can be ensured.

At block 506, the authentication server 114 determines an acceptable level of variance between the generated security token and a security token of a previously enrolled document. As noted above, an acceptable level of variance can be based at least in part on an expected wear of the document and a duration since the document was last presented for authentication. Such an expected wear rate can be calculated based on historical data regarding the presented document or other similar documents. Accordingly, calculation of an acceptable level of variance may include multiplying an expected wear rate by the difference in times associated with two security tokens (e.g., a duration between the current presentation of the document and a past presentation of the document). In some embodiments, acceptable variance between presentations of a document may be determined based on specific aspects of the document (e.g., wear levels of specific portions of a document), differences within various mathematical models of the document (e.g., as derived based on various token-generation algorithms), or a combination thereof.

Thereafter, at block 508, the authentication server 114 verifies whether the generated token matches any previously generated token within the acceptable variance. Illustratively, verification may include retrieval of one or more previously generated tokens from a data store, such as the security token data store 120 of FIG. 1. If the generated token matches a previously generated token to within the acceptable variance, the routine 500 proceeds to block 512, where a successful authentication is recorded. Illustratively, block 512 may include transmission of information to the authentication end point 102 that authentication is successful (e.g., via display page 420 of FIG. 4B). The routine 500 may then continue to block 516, where the newly generated token may be stored (e.g., within the security token data store 120) for future verification. In one embodiment, the newly generated token may be stored in addition to any previously stored token, such that changes to the document over time may be recorded. In another embodiment, the newly generated token may replace any previous tokens within the data store, such that any subsequent authentication must utilize the most recently generated token. In other embodiments, block 516 may be optionally omitted. Subsequently, the routine 500 may end at block 518.

In the instance that verification of the newly generated token fails at block 508, the routine 500 continues to block 514, where an authentication failure is recorded. Illustratively, block 514 may include transmission of an indication of authentication failure to an authentication end point 102. The routine 500 thereafter ends at block 518.

Each of the processes, methods, and algorithms described in the preceding sections may be automated by a computer system that includes one or more computing devices, each of which includes a memory and a processor that includes digital logic circuitry. For example, the processes may be embodied in, and fully or partially automated by, code modules executed by one or more computers, computer processors, or machines configured to execute computer instructions. The code modules may be stored on any type of non-transitory computer-readable medium or computer storage device, such as hard drives, solid state memory, optical discs, and/or the like. The systems and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The processes and algorithms may also be implemented partially or wholly in application-specific circuitry. The results of the disclosed processes and process steps may be stored, persistently or otherwise, in any type of non-transitory computer storage such as, e.g., volatile or non-volatile storage. In other embodiments, the results of the disclosed process and process step may be stored in transitory computer storage, such as a signal. The trending content service 114 may, for example, be implemented by a physical server that comprises one or more computing devices.

While some examples described above may generally utilize linear techniques or algorithms to determine an acceptable level of wear between documents, embodiments of this disclosure may also utilize additional or alternative algorithms. For example, some embodiments of this disclosure may utilize a nearest neighbor algorithm to establish whether a presented document, when compared to a previously enrolled document (or a previous presentation of such an enrolled document), is likely to represent a valid or invalid match. Illustratively, the document authentication service 110 may maintain a data set including a plurality of valid document pairs, such that each valid document pair includes two versions of a valid enrolled document (e.g., a version as originally enrolled, as well as a version after experiencing authentic wear). The document authentication service 110 can further maintain a plurality of invalid document pairs, with each pair including a first version of an enrolled document, as well as an invalid presentation of the document (e.g., a forged version, an illegible version, an incorrectly submitted version, etc.). Thereafter, for each document presented and purported to represent a previously enrolled document, the document authentication service 110 may generate an evaluation pair comprising the presented document and the previously enrolled document. The document authentication service 110 may then process the evaluation pair, along with the set of valid and invalid document pairs, to determine whether the evaluation pair most closely corresponds to a valid or invalid pair. In the instance that the evaluation pair most closely corresponds to a valid pair, the document authentication service 110 may report successful authentication. Conversely, where the evaluation pair most closely corresponds to an invalid pair, the document authentication service 110 may report unsuccessful authentication. While embodiments utilizing linear or nearest neighbor algorithms have been described, one skilled in the art will recognize that additional decision support or pattern matching algorithms, such as decision trees or support vector machines, may be utilized to distinguish between valid and invalid documents based at least in part on an expected wear of the document.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for verifying the authenticity of a document, the system comprising:

a data store including a plurality of security tokens, each of the plurality of security tokens corresponding to at least one of a plurality of physical documents enrolled with the system;

a processor in communication with the data store and configured to:

receive, via a communication network, an enrollment request including first information regarding a presented document;

generate a first security token corresponding to the presented document based at least in part on processing the first information regarding the presented document according to a token generation algorithm, wherein the first security token includes information regarding a plurality of portions of the presented document;

store the first security token, within the data store, as a most recent security token for the presented document;

receive, via the communication network, an authentication request including second information regarding the presented document;

generate a second security token corresponding to the presented document based at least in part on processing the second information regarding the presented document according to the token generation algorithm, wherein the second security token includes information regarding a plurality of portions of the presented document;

determine an acceptable degree of difference between the second security token and the most recent security token for the presented document based at least in part on an expected wear level associated with the presented document and a period of time between creation of the second security token and the most recent security token for the presented document, wherein the expected wear level includes a plurality of expected wear levels, each of the plurality of expected wear levels corresponding to an individual portion of the plurality of portions of the presented document;

compare the second security token with the most recent security token for the presented document to determine the degree of difference between the second security token and the most recent security token;

determine that the degree of difference between the second security token and the most recent security token conforms to the acceptable degree of difference; and transmit, via the communication network, an indication of successful authentication.

2. The system of claim 1, wherein the token generation algorithm comprises at least one of an optical character recognition (OCR) algorithm, a Fourier transform algorithm, a hashing algorithm, an algorithm to determine a set of basis functions for the presented document or an algorithm to determine coefficients for the set of basis functions.

3. The system of claim 1, wherein the presented document comprises a driver's license, passport, birth certificate, social security card, student identification card, or government issued identification card.

4. The system of claim 1, wherein the first information regarding the presented document comprises a photograph of the document, a scan of the document, barcode information related to the document, or a representation of magnetic or optical information stored within the document.

5. The system of claim 1, wherein the processor is further configured to generate the first security token corresponding to the presented document based at least in part on identifying an anomalous feature within the presented document relative to other documents enrolled within the system.

6. The system of claim 1 further comprising an authentication endpoint from which the authentication request is received, wherein the authentication endpoint comprises at least one of a mobile phone, a tablet computing device, a personal computing device, a wearable computing device, a point-of-sale device, a security checkpoint device, or a banking terminal.

7. The system of claim 1, wherein the processor is further configured to, subsequent to storing the first security token as a most recent security token for the presented document and prior to generating the second security token for the presented document:
  receive, via the communication network, an authentication request including third information regarding the presented document, wherein the authentication request including third information regarding the presented document is received prior to generating the second security token for the presented document and subsequent to storing the first security token as a most recent security token for the presented document;
  determine that the third information regarding the presented document represents a newer representation of the presented document; and
  generate a third security token corresponding to the presented document based at least in part on processing the third information regarding the presented document according to the token generation algorithm; and
  replace the first security token with the third security token as the most recent security token for the presented document;
wherein comparing the second security token the most recent security token for the presented document to determine the degree of difference between the second security token and the most recent security token comprises comparing the second security token with the third security token.

8. A computer-implemented method for verifying document authenticity, the method comprising:
  maintaining, within an authentication system, a plurality of security tokens corresponding to documents enrolled within the authentication system;
  receiving an enrollment request including first information regarding a presented document;
  processing the first information regarding the presented document according to a token generation algorithm to generate a first security token corresponding to the presented document, wherein the first security token includes information regarding a plurality of portions of the presented document;
  storing the first security token, within the plurality of security tokens maintained at the authentication system, as a most recent security token for the presented document;
  receiving, at the authentication system, second information regarding the presented document as a request for authentication of the presented document;
  processing the second information regarding the presented document to generate, at the authentication system, a second security token corresponding to the presented document, wherein the second security token includes information regarding a plurality of portions of the presented document;
  determining an acceptable degree of difference between the second security token and the most recent security token for the presented document based at least in part on an expected wear level between with the presented document as represented by the first information and the presented document as represented by the second information, wherein the expected wear level includes a plurality of expected wear levels, each of the plurality of expected wear levels corresponding to an individual portion of the plurality of portions of the presented document;
  comparing, at the authentication system, the second security token the most recent security token for the presented document to determine a degree of difference between the second security token and the most recent security token;
  determining, at the authentication system, that the degree of different between the second security token and the most recent security token conforms to the acceptable degree of difference; and
  transmitting from the authentication system an indication of successful authentication.

9. The computer-implemented method of claim 8, wherein the expected wear level is based at least in part on a period of time elapsed since the presented document was last presented to the authentication system.

10. The computer-implemented method of claim 8, wherein the expected wear level is based at least in part on execution of a machine learning algorithm on a training data set, the training data set comprising information regarding a plurality of training documents.

11. The method of claim 10, wherein the plurality of training documents include a plurality of documents of the same type as the presented document.

12. The computer-implemented method of claim 10, wherein the plurality of training documents include a plurality of documents each including at least one feature also included within the presented document.

13. Non-transitory computer-readable storage media comprising computer-executable instructions to authenticate a document, wherein the computer-executable instructions, when executed by one or more processors corresponding to an authentication system, cause the processors to:
  receive an enrollment request including first information regarding a presented document;
  process the first information regarding the presented document according to a token generation algorithm to generate a first security token corresponding to the presented document, wherein the first security token includes information regarding a plurality of portions of the presented document;
  store, within a memory in communication with the one or more processors, the first security token as a most recent security token for the presented document;
  receive second information regarding the presented document as a request for authentication of the presented document;
  process the second information regarding the presented document to generate a second security token corresponding to the presented document, wherein the second security token includes information regarding a plurality of portions of the presented document;
  determine an acceptable degree of difference between the second security token and the most recent security token for the presented document based at least in part on an expected wear level between with the presented document as represented by the first information and the presented document as represented by the second information, wherein the expected wear level includes a plurality of expected wear levels, each of the plurality of expected wear levels corresponding to an individual portion of the plurality of portions of the presented document;

compare the second security token with the most recent security token for the presented document to determine a degree of difference between the second security token and the most recent security token;

determine that the degree of difference between the second security token and the most recent security token conforms to the acceptable degree of difference; and transmit an indication of successful authentication.

14. The non-transitory computer-readable storage media of claim 13, wherein the expected wear level is determined based at least in part on a substrate material of the presented document.

15. The non-transitory computer-readable storage media of claim 13, wherein the computer-executable instructions further cause the processors to determine that the second security token does not correspond to a set of invalid security tokens, wherein the set of invalid security tokens is generated based at least in part on invalid documents.

16. The non-transitory computer-readable storage media of claim 13, wherein the indication of successful authentication comprises an image of the presented document previously stored within the authentication system.

17. The non-transitory computer-readable storage media of Claim 13, wherein the computer-executable instructions further cause the processors to verify a location associated with the received information based at least in part on a previous submission of the document for authentication.

18. The non-transitory computer-readable storage media of claim 13, wherein the received information further comprises a purported identifier associated with the document, and wherein the at least one security token is determined based at least in part on the purported identifier.

* * * * *